Feb. 23, 1926.
T. F. M. CRISP
1,573,916
SPRING MOUNTING FOR VEHICLES
Filed March 24, 1925
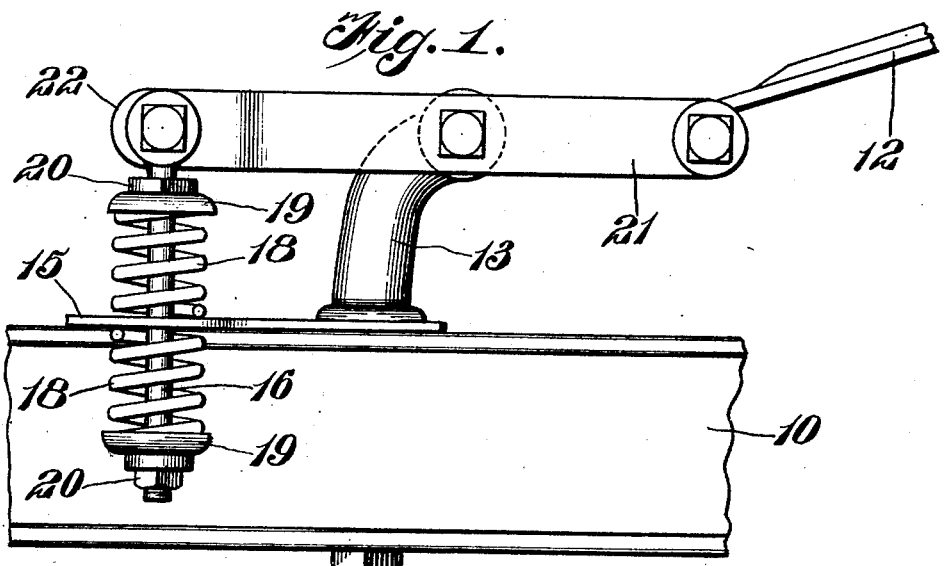
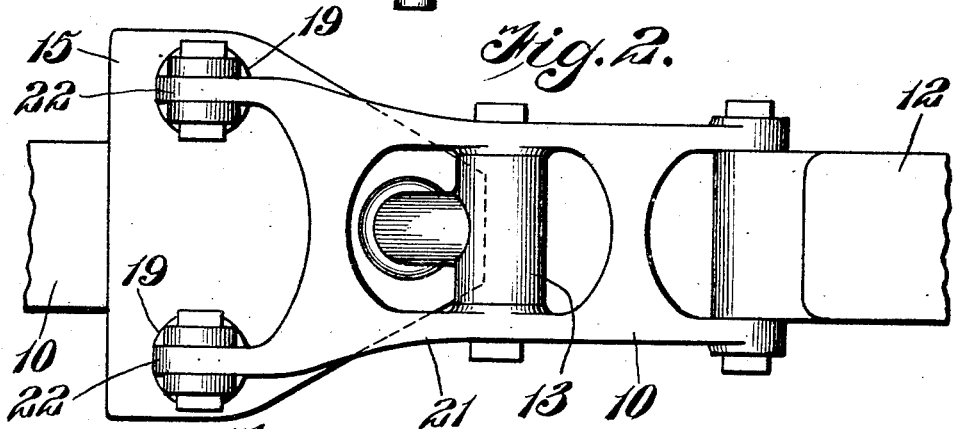
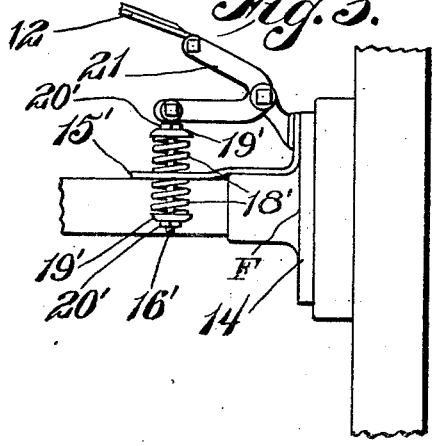
Invento
Thomas F. M. Crisp
By Watson E. Coleman
Attorney Patented Feb. 23, 1926.

1,573,916

UNITED STATES PATENT OFFICE.

THOMAS F. M. CRISP, OF NORTH UVALDE, TEXAS, ASSIGNOR OF ONE-HALF TO GEORGE W. JOHNSON, OF NORTH UVALDE, TEXAS.

SPRING MOUNTING FOR VEHICLES.

Application filed March 24, 1925. Serial No. 18,011.

*To all whom it may concern:*

Be it known that I, THOMAS F. M. CRISP, a citizen of the United States, residing at North Uvalde, in the county of Uvalde and State of Texas, have invented certain new and useful Improvements in Spring Mountings for Vehicles, of which the following is a specification, reference being had to the accompanying drawings.

This invention relates to spring mountings for vehicles and more particularly to a device primarily intended for use in supplementing the present springs of a well known type of automobile.

An important object of the invention is to provide a device of this character which may be readily applied to the automobile and which includes means not only checking rebound of the vehicle but assisting the springs in absorbing the initial movement of shocks applied to the car.

A further object of the invention is to provide a device of this character which may be very cheaply produced and which will be durable and efficient in service.

These and other objects I attain by the construction shown in the accompanying drawings, wherein for the purpose of illustration is shown a preferred embodiment of my invention and wherein:—

Figure 1 is a detailed elevation showing the manner of applying the shock absorbers to the front axle of the vehicle;

Figure 2 is a plan view thereof;

Figure 3 is a reduced detailed view showing the manner of applying the device to a rear axle; and Figure 4 is a detailed view showing a modified manner of attaching the plate 15 or 15′ to the axle.

Referring now more particularly to the drawings, the numeral 10 designates a vehicle axle and in the type of vehicle at present dealt with, the body has a transversely extending spring 13 overlying the axle and the ends of which are normally adapted for connection with perches 13 carried by the ends of the axle 10. Where the axle 10 is a front axle as illustrated in Figure 1, these perches are carried directly by the axle and where it is a rear axle as illustrated in Figure 3, the perches are carried by a drum 14 carried by the axle.

In the former instance, I mount upon the axle by means of the perch a plate 15 which is rigid to the axle and which has directed therethrough at opposite sides of the axle a pair of vertically extending shafts 16. Upon these shafts at opposite sides of the plate are mounted springs 18 held in engagement with the plate by adjustable spring seats 19 adjusted by means of nuts 20. Upon the perch, a lever 21 is mounted intermediate its ends, this lever having one end thereof disposed over the shafts 16 and provided with spaced arms 22, each adapted for engagement with one of said shafts. The opposite end of the lever is slotted to receive the end of the spring 12 as indicated.

With the rear axle which has a brake flange F upon which the perch is mounted, a plate 15′ is employed corresponding to the plate 15, the plate being secured in position by the spring perch but having its end rigidly engaged with the axle. Corresponding shafts 16′ are provided having the springs 18′, spring seats 19′ and nuts 20′ corresponding to those of the structure above described. The lever, indicated at 21, is in the form of a bell crank, one arm of which receives the end of the spring 12 and the opposite end of which coacts with the shafts 16′. It will be obvious that instead of employing the plates 15, 15′, the axles themselves may be formed with flanges 23, as suggested in Figure 4, through which the shafts 16, 16′ may be directed.

In the operation of the device, when a jolt is applied to the vehicle as in passing over a rough portion of the road, as the body of the vehicle moves downwardly, the thrust will be taken by the upper springs 18, 18′ and as the movement of the body is reversed, the thrust will be checked by the lower springs of the same shafts. It will be obvious that a device of this character may be very cheaply produced and may be readily applied to the vehicle so that but little need be added to the original cost to cover installation. It will furthermore be obvious that the structure hereinbefore set forth is capable of a certain range of change and modification without materially departing from the spirit of my invention, and I accordingly do not limit myself to such specific structure except as hereinafter claimed.

I claim:—

1. In a spring mounting for vehicles having an axle and a semi-elliptic spring overlying the axle, a plate carried by the axle, a perch extending upwardly from the axle adjacent the plate, a lever mounted intermediate its ends upon the perch and having means at one end for receiving an end of the vehicle spring and having at its opposite end a shaft directed through said plate, spring seats carried by the shaft in spaced relation to the plate and springs surrounding the shaft at opposite sides of said plate and between the plate and said spring seats, said perch securing said plate in position upon said axle.

2. In a spring mounting for vehicles having an axle provided with a vertical flange, a perch secured to said flange and extending over the axle, a semi-elliptic spring overlying the axle and having its end disposed adjacent the perch, a plate inserted between the perch and flange and held in position against the flange and having a portion overlying the axle, a bell crank lever pivoted intermediate its ends upon the perch and at one end to the axle and having its opposite end overlying said portion of the plate, a shaft directed through said plate, spring seats carried by the shaft in spaced relation to the plate and springs surrounding the shaft at opposite sides of said plate and between the plate and said spring seats.

In testimony whereof I hereunto affix my signature.

THOMAS F. M. CRISP.